US008825862B2

(12) United States Patent
Anderson et al.

(10) Patent No.: US 8,825,862 B2
(45) Date of Patent: Sep. 2, 2014

(54) OPTIMIZATION OF RESOURCE PROVISIONING IN A NETWORKED COMPUTING ENVIRONMENT

(75) Inventors: Jason L. Anderson, San Jose, CA (US); Gregory J. Boss, Saginaw, MI (US); Jeffrey L. Coveyduc, San Jose, CA (US); Christopher W. Roach, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 13/195,326

(22) Filed: Aug. 1, 2011

(65) Prior Publication Data

US 2013/0036226 A1     Feb. 7, 2013

(51) Int. Cl.
*G06F 15/173*     (2006.01)

(52) U.S. Cl.
USPC ........................................................ 709/226

(58) Field of Classification Search
USPC ........................................................ 709/226
See application file for complete search history.

(56) References Cited

U.S. PATENT DOCUMENTS

| | | | |
|---|---|---|---|
| 5,093,912 A | 3/1992 | Dong et al. | |
| 6,115,640 A * | 9/2000 | Tarumi | 700/99 |
| 6,856,845 B2 * | 2/2005 | Fromherz et al. | 700/97 |
| 7,516,457 B2 | 4/2009 | Eilam et al. | |
| 7,577,722 B1 | 8/2009 | Khandekar et al. | |
| 7,636,764 B1 * | 12/2009 | Fein et al. | 709/212 |
| 7,809,831 B2 | 10/2010 | Matsumitsu et al. | |
| 7,817,794 B2 * | 10/2010 | Galvin | 379/265.03 |
| 8,069,161 B2 * | 11/2011 | Bugir et al. | 707/706 |
| 8,135,795 B2 * | 3/2012 | Birkestrand et al. | 709/208 |
| 8,180,922 B2 * | 5/2012 | Dini et al. | 709/241 |
| 8,286,183 B2 * | 10/2012 | Baird et al. | 718/107 |
| 8,463,902 B2 * | 6/2013 | Shafiee et al. | 709/224 |
| 2006/0159014 A1 | 7/2006 | Breiter et al. | |
| 2007/0214455 A1 | 9/2007 | Williams et al. | |
| 2009/0276771 A1 | 11/2009 | Nickolov et al. | |
| 2011/0138047 A1 | 6/2011 | Brown et al. | |
| 2011/0145153 A1 * | 6/2011 | Dawson et al. | 705/80 |
| 2011/0145392 A1 * | 6/2011 | Dawson et al. | 709/224 |
| 2011/0246596 A1 * | 10/2011 | Cao et al. | 709/208 |

OTHER PUBLICATIONS

Zhu, J. et al, "Twinkle: A Fast Resource Provisioning Mechanism for Internet Services", Zhenxiao.com, pp. 1-9. No publication date cited, Oct. 7, 2009.
Mell et al., "The NIST Definition of Cloud Computing", National Institute of Standards and Technology, Information Technology Laboratory, Version 15, Oct. 7, 2009, 2 pages.

* cited by examiner

*Primary Examiner* — Alicia Baturay
(74) *Attorney, Agent, or Firm* — William E. Schieser; Keohane & D'Alessandro, PLLC

(57) ABSTRACT

In general, embodiments of the present invention provide an approach for pre-provisioning computing resource sub-components in order to achieve improved overall provisioning times. In a typical embodiment, when a workload request is received, a set/sequence of tasks needed to complete the workload request is identified. Based on the set of tasks, a set of corresponding computing resources is determined. Rather than provision each computing resource as a whole, embodiments of the present invention break each computing resource into its individual sub-components. Once the sub-components are identified, the time required to provision (i.e., provisioning time) each sub-component is determined (e.g., based on historical data). Based on these provisioning times, an optimal order in which the sub-components should be provisioned is determined, and the sub-components are then provisioned in this order.

19 Claims, 5 Drawing Sheets

OPTIMIZATION OF RESOURCE PROVISIONING IN A NETWORKED COMPUTING ENVIRONMENT

TECHNICAL FIELD

In general, the present invention relates to the optimization of computing resource provisioning in a networked computing environment (e.g., a cloud computing environment). Specifically, the present invention relates to provisioning computing resources by optimizing the provisioning of sub-components of the computing resources.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Cloud computing services are typically rendered within a relatively static hardware pool whereby operating systems and applications are deployed and reconfigured to meet the computational demands of consumers. Within the cloud environment's boundaries, application images can be installed and overwritten, Internet Protocol (IP) addresses may be modified, and real and virtual processors may be allocated to meet changing business needs. Presently, different cloud service providers may take varying amounts of time to provision computing resources workload requested by consumers. For example, some cloud providers may provision a particular resource in a matter of seconds, while others may take hours. The differences in provisioning speeds are generally caused by at least three factors: the type of storage architecture, the architecture of the cloud management platform, and/or the methods used to provision resources. As such, challenges can exist in providing consistent and reliable computing resource provisioning times.

SUMMARY

In general, embodiments of the present invention provide an approach for pre-provisioning computing resource sub-components in order to achieve improved overall provisioning times. In a typical embodiment, when a workload request is received, a set/sequence of tasks needed to complete the workload request is identified. Based on the set of tasks, a set of corresponding computing resources is determined. Rather than provision each computing resource as a whole, embodiments of the present invention break each computing resource into its individual sub-components. Once the sub-components are identified, the time required to provision (i.e., provisioning time) each sub-component is determined (e.g., based on historical data). Based on these provisioning times, an optimal order in which the sub-components should be provisioned is determined, and the sub-components are then provisioned in this order.

A first aspect of the present invention provides a computer-implemented method for optimizing provisioning of computing resources in a networked computing environment, comprising: receiving a workload request in a computer data structure of the networked computing environment; determining a set of tasks needed to process the workload request; identifying a set of computing resources in the networked computing environment needed to perform the set of tasks; identifying a set of sub-components for each of the set of computing resources; determining an amount of provisioning time needed to provision each of the set of sub-components; and determining an order for provisioning the set of sub-components based on the amount of provisioning time needed to process each of the set of sub-components.

A second aspect of the present invention provides a system for optimizing provisioning of computing resources in a networked computing environment, comprising: a memory medium comprising instructions; a bus coupled to the memory medium; and a processor coupled to the bus that when executing the instructions causes the system to: receive a workload request in a computer data structure of the networked computing environment; determine a set of tasks needed to process the workload request; identify a set of computing resources in the networked computing environment needed to perform the set of tasks; identify a set of sub-components for each of the set of computing resources; determine an amount of provisioning time needed to provision each of the set of sub-components; and determine an order for provisioning the set of sub-components based on the amount of provisioning time needed to process each of the set of sub-components.

A third aspect of the present invention provides a computer program product for optimizing provisioning of computing resources in a networked computing environment, the computer program product comprising a computer readable storage media, and program instructions stored on the computer readable storage media, to: receive a workload request in a computer data structure of the networked computing environment; determine a set of tasks needed to process the workload request; identify a set of computing resources in the networked computing environment needed to perform the set of tasks; identify a set of sub-components for each of the set of computing resources; determine an amount of provisioning time needed to provision each of the set of sub-components; and determine an order for provisioning the set of sub-components based on the amount of provisioning time needed to process each of the set of sub-components.

A fourth aspect of the present invention provides a method for deploying a system for optimizing provisioning of computing resources in a networked computing environment, comprising: providing a computer infrastructure being operable to: receive a workload request in a computer data structure of the networked computing environment; determine a set of tasks needed to process the workload request; identify a set of computing resources in the networked computing environment needed to perform the set of tasks; identify a set of sub-components for each of the set of computing resources; determine an amount of provisioning time needed to provision each of the set of sub-components; and determine an order for provisioning the set of sub-components based on the amount of provisioning time needed to process each of the set of sub-components.

BRIEF DESCRIPTION OF THE DRAWINGS

These and other features of this invention will be more readily understood from the following detailed description of the various aspects of the invention taken in conjunction with the accompanying drawings in which.

Figure 1:
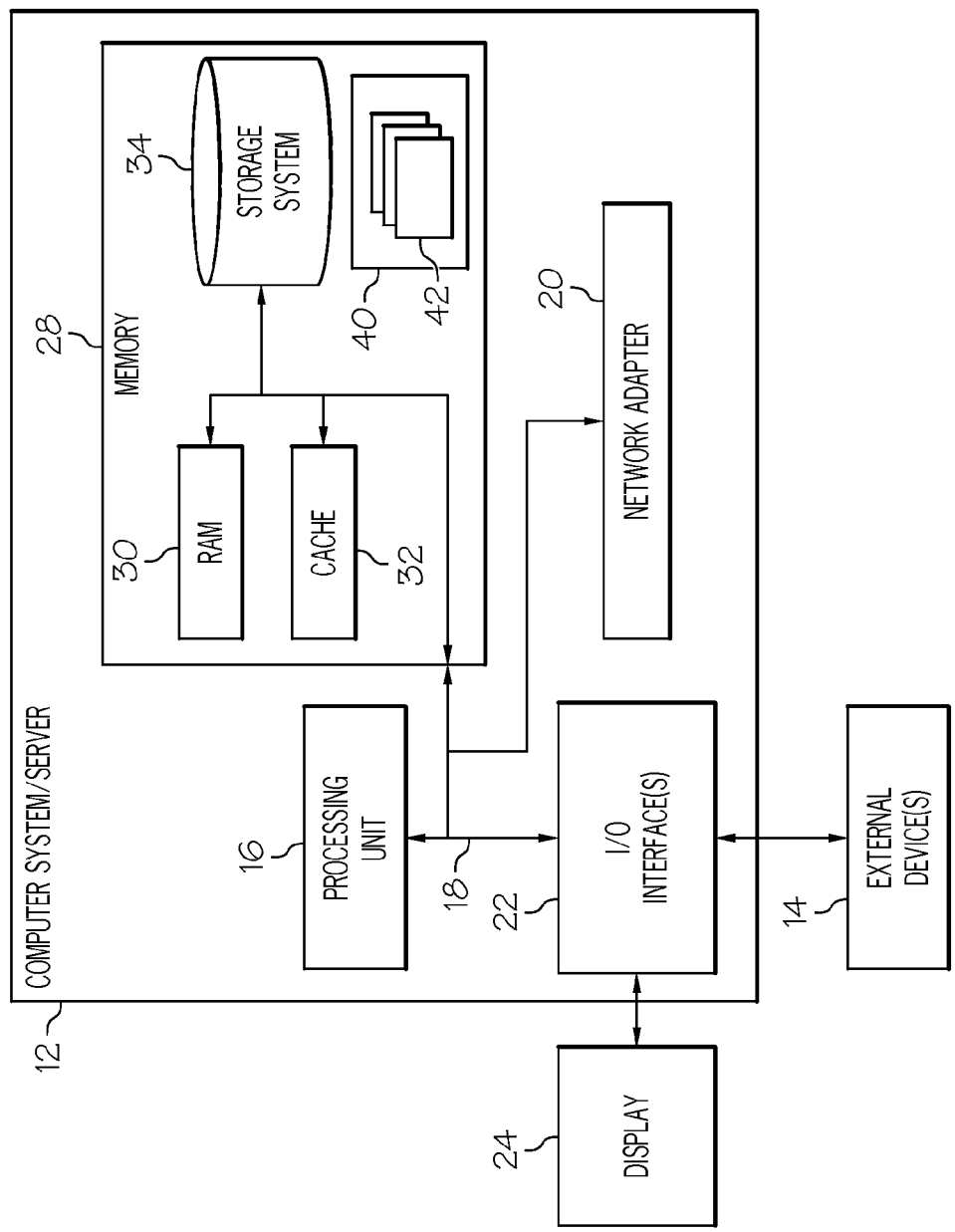
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide an approach for pre-provisioning computing resource sub-components in order to achieve improved overall provisioning times. In a typical embodiment, when a workload request is received, a set/sequence of tasks needed to complete the workload request is identified. Based on the set of tasks, a set of corresponding computing resources is determined. Rather than provision each computing resource as a whole, embodiments of the present invention break each computing resource into its individual sub-components. Once the sub-components are identified, the time required to provision (i.e., provisioning time) each sub-component is determined (e.g., based on historical data). Based on these provisioning times, an optimal order in which the sub-components should be provisioned is determined, and the sub-components are then provisioned in this order.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
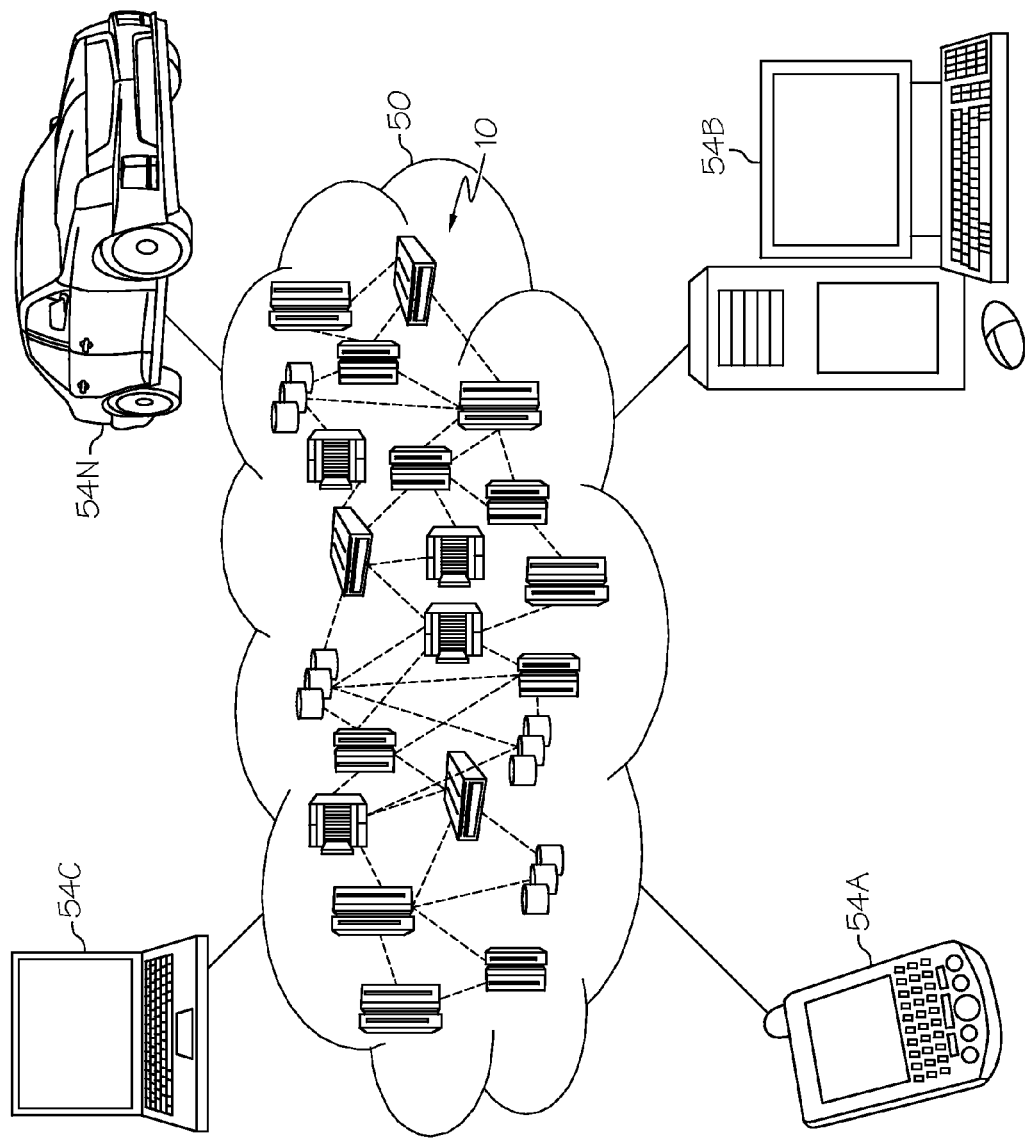
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
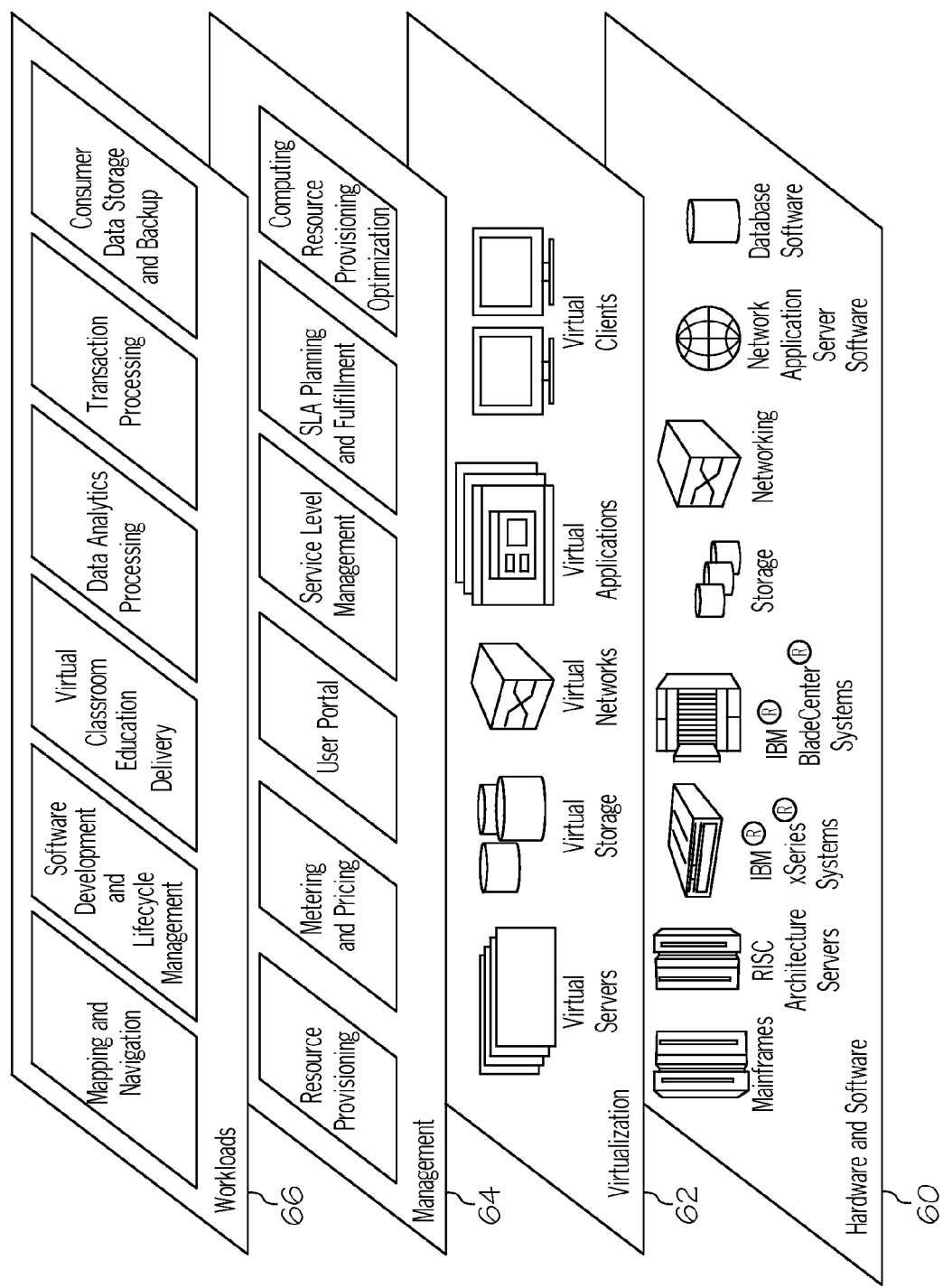
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is computing resource provisioning optimization, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the computing resource provisioning optimization functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
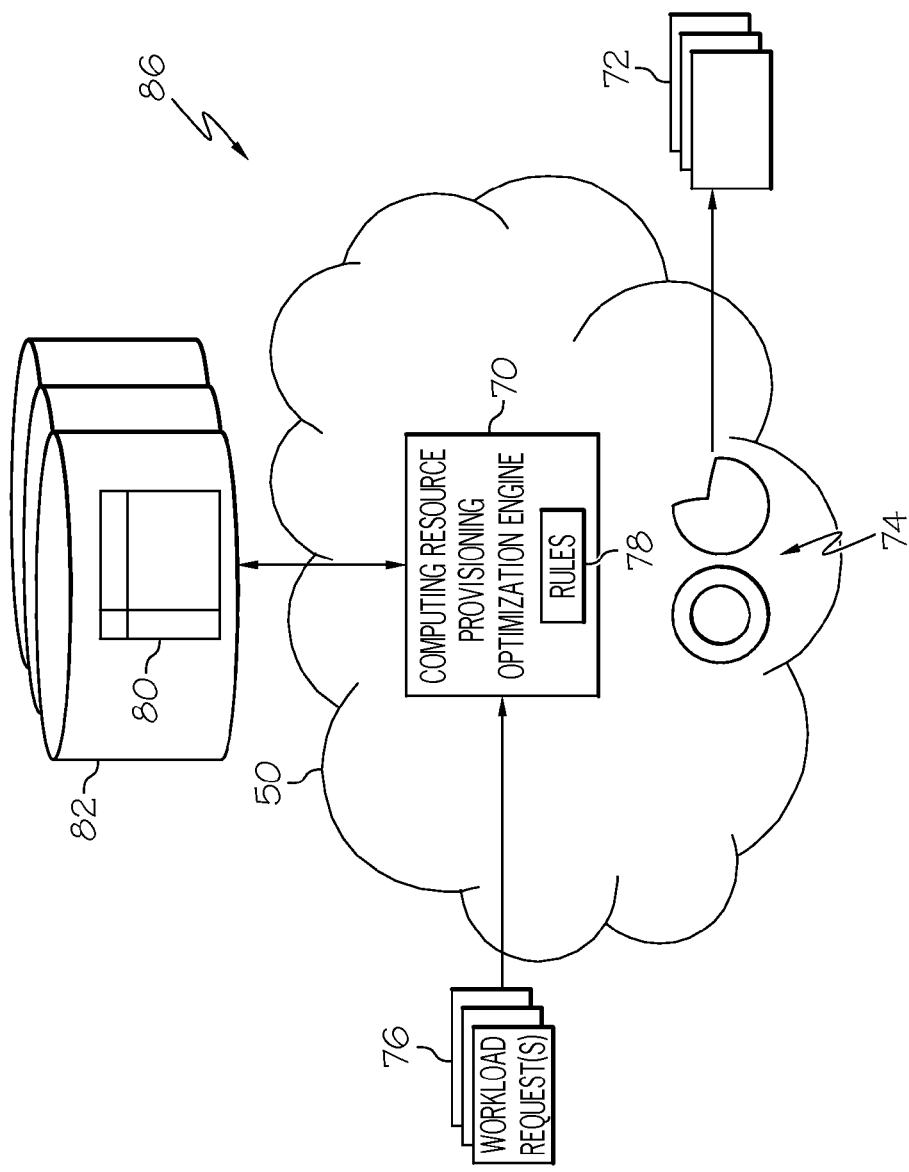
FIG. 4 depicts a system diagram according to an embodiment of the present invention.

Referring now to FIG. 4, a system diagram according to an aspect of the present invention is shown. As depicted, a computing resource provisioning optimization engine (engine 70) is shown. In general, engine 70 can be implemented as program 40 on computer system 12 of FIG. 1 and can implement the functions recited herein as depicted in management layer 64 of FIG. 3. In general, engine 70 comprises a rules engine that processes a set (at least one) of rules 78 and utilizes historical data (stored on a set of computer data structures 82) to determine an order in which sub-components 72 of computing resources 74 (that are needed to process workload request(s) 76) should be provisioned.

Along these lines, engine 70 will perform multiple functions. Specifically, among other functions, engine 70 will: receive a workload request 76 in a computer storage device (e.g., in database 82) of a networked computing environment 86 (e.g., comprising a cloud environment 50); determine a set (at least one) of tasks (e.g., stored in an computer data structure 80 or the like) needed to process the workload request 76; identify a set of computing resources 74 in the networked computing environment 86 needed to perform the set of tasks; identify a set of sub-components 72 for each of the set of computing resources 74; determine an amount of provisioning time needed to provision each of the set of sub-components 72 (e.g., based on historical data for the sub-components in being provisioned for previous, similar workload requests); determine an order for provisioning the set of sub-components based on the amount of provisioning time needed to process each of the set of sub-components (e.g., sub-components that are forecasted to take longer than a predetermined time-based threshold will be provisioned before sub-components taking less than the predetermined time-based threshold) and/or any interdependencies between the set of sub-components 72; provision the set of sub-components 72 according to the order; and/or perform the set of tasks needed to process the set of workload requests 76.

In general, this approach can also be referred to as pre-provisioning computing resources 74 and/or sub-components 72. Regardless, as indicated above, a set of rules 78 are utilized to facilitate the teachings recited herein. Such rules 78 can facilitate utilization of one or more of the following methods by engine 70.

Evaluating Computing Resource Sub-Components

Under this method, engine 80 would, in one embodiment, evaluate a set of storage devices 82 (e.g., configuration management databases (CMDB) or the like) to determine the component parts of each potential image available in a cloud environment catalog. In another embodiment, engine 70 could identify the sub-components 72 via manual entry by a cloud environment administrator or the like. The cloud environment administrator may also denote automation scripts (e.g., workflows) for each sub-component. After determining the sub-components 72, this method would then mine past logs (e.g., comprising previous workload data, portioned resource, etc.) and/or begin to record future provisioning workload requests and record the average time to complete provisioning of each sub-component. The method would also record the standard order in which sub-components are installed and correlate any dependencies between sub-components.

Determining Sub-Component Processing/Provisioning Order

Multiple techniques could be employed to determine the optimal processing/provisioning order of sub-components 72. One technique is to assign a higher priority to all sub-components 72 that have no current dependencies on other components. This would help to reduce delays in the provisioning process. Another technique to determine an optimal sub-component 72 processing order would be to assign a higher priority to all sub-components 72 that have the highest processing times. The latter approach could be performed based on historical data for similar sub-components 72 and/or similar workload requests 76.

Variable Order Execution Method

In this method, engine 70 could provision certain sub-components 72 ahead of the sub-components 72 to which they have a dependency. In this manner, end-to-end provisioning of the cloud workload request 76 is achieved faster than if done in an ad-hoc order. For example, assume that a cloud offering requires special approval if a user workload requests a private Virtual Local Area Network (VLAN) with a Virtual Private Network (VPN) service attached. Normally a human task (admin approving the workload request) would occur before the VLANs and VPN tunnels could be provisioned. In this method, engine 70 would pre-provision the network components and delay only the final step of activating the interface of a Virtual Machine (VM), the VPN, etc. Once the manual approval is received, the only remaining task is to activate the virtual network adapter, a process that cuts down significantly on the end-to-end waiting time.

Figure 5:
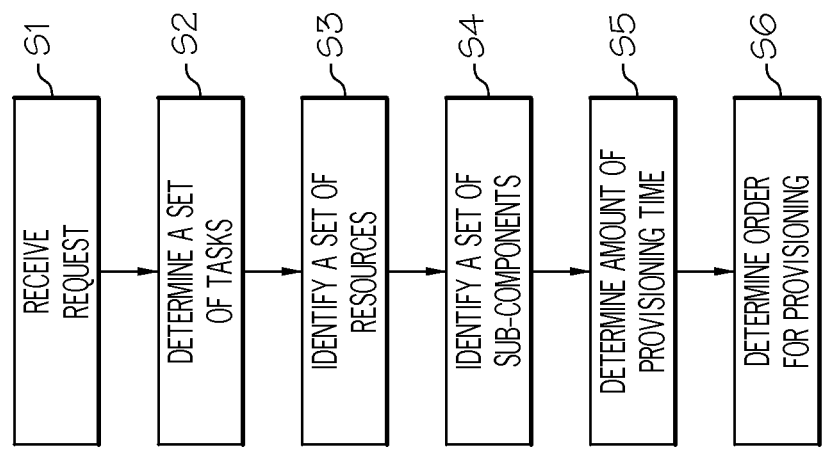
FIG. 5 depicts a method flow diagram according to an embodiment of the present invention.

Referring now to FIG. 5, a method flow diagram according to an embodiment of the present invention is shown. As depicted, in step S1, a workload request is received in a computer data structure of the networked computing environment. In step S2, a set of tasks needed to process the workload request is determined. In step S3, a set of computing resources in the networked computing environment needed to perform the set of tasks is identified. In step S4, a set of sub-components is identified for each of the set of computing resources. In step S5, an amount of provisioning time needed to provision each of the set of sub-components is determined. In step S6, an order for provisioning the set of sub-components is determined based on the amount of provisioning time needed to process each of the set of sub-components and/or any interdependencies therebetween.

While shown and described herein as a computing resource provisioning optimization solution, it is understood that the invention further provides various alternative embodiments. For example, in one embodiment, the invention provides a computer-readable/useable medium that includes computer program code to enable a computer infrastructure to provide computing resource provisioning optimization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide computing resource provisioning optimization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for computing resource provisioning optimization. In this case, a computer infrastructure, such as computer system 12 (FIG. 1), can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for optimizing provisioning of computing resources in a networked computing environment, comprising:
    receiving a workload request in a computer data structure of the networked computing environment;
    determining a set of tasks needed to process the workload request;
    identifying a set of computing resources in the networked computing environment needed to perform the set of tasks;
    identifying a set of sub-components for each of the set of computing resources;
    determining an amount of provisioning time needed to provision each of the set of sub-components, the amount of provisioning time being an amount of time that a particular sub-component requires to become prepared and equipped to perform a task; and
    determining an order for provisioning the set of sub-components based on the amount of provisioning time needed to process each of the set of sub-components and on interdependencies between the set of sub-components.

2. The computer-implemented method of claim 1, further comprising:
    provisioning the set of sub-components based on their respective amount of provisioning time; and
    performing, responsive to the provisioning, the set of tasks using the set of sub-components.

3. The computer-implemented method of claim 2, the provisioning comprising provisioning sub-components of the set of sub-components having an amount of provisioning time greater than a predetermined threshold prior to provisioning sub-components of the set of sub-components having an amount of provisioning time less than the predetermined threshold.

4. The computer-implemented method of claim 1, the amount of provisioning time being determined based on historical data pertaining to the set of sub-components.

5. The computer-implemented method of claim 1, the set of tasks being performed in a sequence corresponding to the order in which the set of sub-components are provisioned.

6. The computer-implemented method of claim 1, the networked computing environment comprising a cloud computing environment, and the set of computing resources comprising cloud computing resources.

7. A system for optimizing provisioning of computing resources in a networked computing environment, comprising:
    a memory medium comprising instructions;
    a bus coupled to the memory medium; and
    a processor coupled to the bus that when executing the instructions causes the system to:
    receive a workload request in a computer data structure of the networked computing environment;
    determine a set of tasks needed to process the workload request;
    identify a set of computing resources in the networked computing environment needed to perform the set of tasks;
    identify a set of sub-components for each of the set of computing resources;
    determine an amount of provisioning time needed to provision each of the set of sub-components, the amount of provisioning time being an amount of time that a particular sub-component requires to become prepared and equipped to perform a task; and
    determine an order for provisioning the set of sub-components based on the amount of provisioning time needed to process each of the set of sub-components and on interdependencies between the set of sub-components.

8. The system of claim 7, the memory medium further comprising instructions for causing the system to:
    provision the set of sub-components based on their respective amount of provisioning time; and
    perform, responsive to the provisioning, the set of tasks using the set of sub-components.

9. The system of claim 8, the memory medium further comprising instructions for causing the system to provision sub-components of the set of sub-components having an amount of provisioning time greater than a predetermined threshold prior to provisioning sub-components of the set of sub-components having an amount of provisioning time less than the predetermined threshold.

10. The system of claim 7, the amount of provisioning time being determined based on historical data pertaining to the set of sub-components.

11. The system of claim 7, the set of tasks being performed in a sequence corresponding to the order in which the set of sub-components are provisioned.

12. The system of claim 7, the networked computing environment comprising a cloud computing environment, and the set of computing resources comprising cloud computing resources.

13. A computer program product for optimizing provisioning of computing resources in a networked computing environment, the computer program product comprising a computer readable storage device, and program instructions stored on the computer readable storage device, to:
    receive a workload request in a computer data structure of the networked computing environment;
    determine a set of tasks needed to process the workload request;
    identify a set of computing resources in the networked computing environment needed to perform the set of tasks;

identify a set of sub-components for each of the set of computing resources;

determine an amount of provisioning time needed to provision each of the set of sub-components, the amount of provisioning time being an amount of time that a particular sub-component requires to become prepared and equipped to perform a task; and determine an order for provisioning the set of sub-components based on the amount of provisioning time needed to process each of the set of sub-components and on interdependencies between the set of sub-components.

14. The computer program product of claim 13, the computer readable storage device further comprising instructions to:

provision the set of sub-components based on their respective amount of provisioning time; and perform, responsive to the provisioning, the set of tasks using the set of sub-components.

15. The computer program product of claim 14, the computer readable storage device further comprising instructions to provision sub-components of the set of sub-components having an amount of provisioning time greater than a predetermined threshold prior to provisioning sub-components of the set of sub-components having an amount of provisioning time less than the predetermined threshold.

16. The computer program product of claim 13, the amount of provisioning time being determined based on historical data pertaining to the set of sub-components.

17. The computer program product of claim 13, the set of tasks being performed in a sequence corresponding to the order in which the set of sub-components are provisioned.

18. The computer program product of claim 13, the networked computing environment comprising a cloud computing environment, and the set of computing resources comprising cloud computing resources.

19. A method for deploying a system for optimizing provisioning of computing resources in a networked computing environment, comprising:

providing a computer infrastructure being operable to:

receive a workload request in a computer data structure of the networked computing environment;

determine a set of tasks needed to process the workload request;

identify a set of computing resources in the networked computing environment needed to perform the set of tasks;

identify a set of sub-components for each of the set of computing resources;

determine an amount of provisioning time needed to provision each of the set of sub-components, the amount of provisioning time being an amount of time that a particular sub-component requires to become prepared and equipped to perform a task; and determine an order for provisioning the set of sub-components based on the amount of provisioning time needed to process each of the set of sub-components and on interdependencies between the set of sub-components.

* * * * *